May 15, 1923.
J. C. DA NOBREGA
1,455,325
MOMENTUM OPERATED BRAKE
Filed Sept. 1, 1921
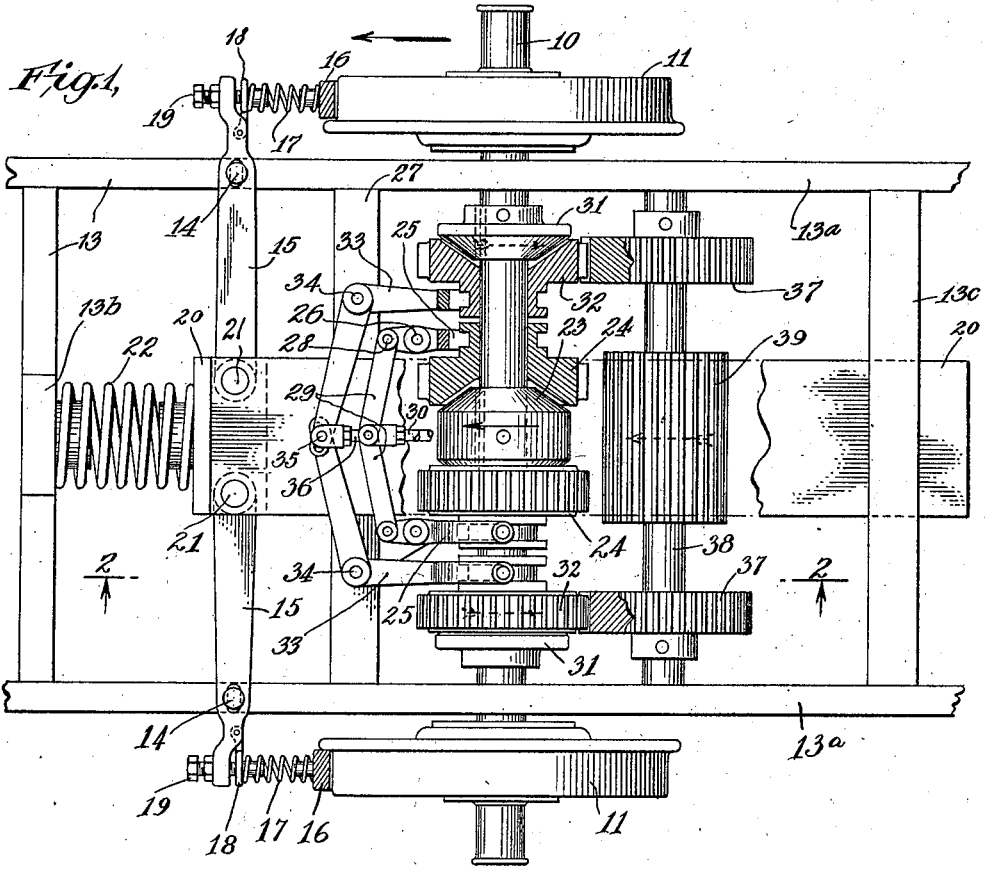
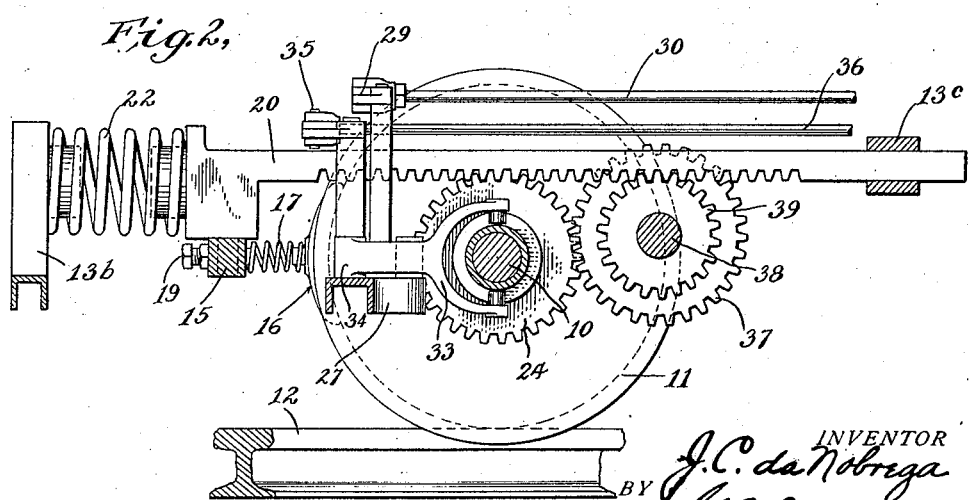
INVENTOR
J. C. da Nobrega
BY
ATTORNEY Patented May 15, 1923.

1,455,325

UNITED STATES PATENT OFFICE.

JOAQUIM COUTINHO DA NOBREGA, OF NEW YORK, N. Y.

MOMENTUM-OPERATED BRAKE.

Application filed September 1, 1921. Serial No. 497,557.

*To all whom it may concern:*

Be it known that I, JOAQUIM COUTINHO DA NOBREGA, a citizen of Brazil, residing at New York city, in the county of New York and State of New York, have invented certain new and useful Improvements in Momentum-Operated Brakes, of which the following is a specification.

This invention relates to means for controlling the speed of moving machines or vehicles, and has particular reference to a braking means adapted to be operated powerfully and hence effectively by means of the momentum of the vehicle or movement of the machine.

Among the objects of the invention is to provide a brake including a shoe or similar friction element for co-operation with a wheel or some other relatively movable part, and with a peculiar arrangement of mechanical parts caused to be moved powerfully by the rotation of some part of the machine, such as an axle, and serving as a result to force such friction element into contact with the wheel or the like so as to either stop the rotation of the wheel or to retard such rotation.

A further object of the invention is to provide a brake for a moving vehicle, including an actuator movable always in a predetermined direction for braking and co-operating with momentum operated members for causing such movement of the actuator irrespective of the direction in which the vehicle may be moving.

A still further object is to provide a brake for a moving vehicle or machine, including an actuator movable in a predetermined direction for braking, and means to automatically return said actuator to normal position.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of my improvement, with parts in section.

Fig. 2 is a vertical sectional view of the same on the line 2—2 of Fig. 1.

From what is stated above I wish it to be distinctly understood that while I have indicated my improvement as applied to a portion of a railroad car truck, the scope of the invention is not to be limited with respect to the general type of vehicle or machine. In short the invention is useful in connection with any type or design of mechanism in which a relatively sudden stop is desired or where the power relied upon for operating the brake may be obtained from the momentum of the machine or vehicle itself, even though the adjustment of the friction elements may be such as not to cause immediate stoppage.

Referring now more specifically to the drawings I show a portion of a vehicle including an axle 10 to which are secured wheels 11 adapted for rolling upon the rails 12. 13 indicates a frame having any suitable or approved bearing connections with the axle 10 and including parallel side bars 13ª and front and rear cross bars 13ᵇ and 13ᶜ. Obviously the vehicle may be operated forward in either direction but for convenience of this description it will be assumed that the forward direction is toward the left as indicated by the arrow at the upper portion of Fig. 1.

Pivoted upon vertical pivots 14 on the side bars 13ª are a pair of levers connected in any suitable manner to a pair of friction elements such as brake shoes 16, normally spaced slightly from the peripheries of the wheels 11. The connections between the lever and the shoes include cushions in the form of coil springs 17, each carried by a knuckle 18 adjustable toward or from the outer end of the adjacent lever 15 as by means of a screw 19 tapped into said end of the lever. This screw indicates broadly any kind of means that may be employed for determining the effective contact between the brake shoe and the wheel, varying however according to the wear on the parts and to the force desired to be applied upon the brake.

Any suitable means may be provided to actuate these brake levers always in the same direction, whether the vehicle is moving forward or rearward, and to utilize the momentum of the vehicle for the application of power to the brake shoes, and whereby the momentum of the vehicle or other machine to be stopped will in effect dissipate itself in the act when operating the brakes.

To carry forward the purpose above indicated I provide an actuator in the form of a rack 20 extending longitudinally of the frame, preferably along its center and above the axle, the teeth of the rack extending downward. The levers 15 are pivotally connected at 21 to the front end of the actuator, and being levers of the first class are caused to rotate around their pivots with great power when the actuator is moved forward against the force of a coil spring 22 extending between the front end of the actuator and the front cross bar 13$^b$, this spring typifying any suitable automatic means tending to return the actuator to normal position.

Fixed to the central portion of the axle is a double faced cone 23, the conical faces of which are arranged for co-operation with a pair of clutch members 24 which are otherwise mounted loosely upon the axle. Co-acting with each clutch member 24 is a yoke 25 pivoted at 26 upon any suitable relatively stationary member such as a bar 27 constituting a part of the frame. These yokes 25 may be regarded as first class levers, to the forward ends of which are pivoted at 28 a pair of toggle links 29. 30 indicates a draft rod arranged to be operated by hand or otherwise in any approved manner for the purpose of straightening the toggle and so causing the clutch member 24 to be gripped upon the conical faces of the member 23. With the machine moving in the direction indicated the clutch members 24 will be rotated in the same direction. These clutch members have spur teeth meshing with the teeth of the actuator, and so when the clutch members are rotated by the double cone the actuator will be moved forward forcibly, bringing the brake shoes into engagement with the wheels in accordance with the adjustment as above described. After the braking effect is realized the manual means 30 will be restored to its normal position, thus setting free the clutch members from the double cone, and the spring 22 will restore the brake shoes and actuator to normal position. It will be noted that with the arrangement of the toggle in connection with the two clutch members similarly situated on opposite ends of the double cone, they will both operate simultaneously with equal force.

When it is desired to brake the machine or vehicle when moving in the reverse direction, or to the right as indicated, I employ a pair of cones 31 fixed to the axle 10 just within the frame bars 13$^a$ and with which co-operate clutch members 32 having spur teeth on their peripheries. These clutch members 32 are mounted loosely upon the axle and are controlled in their movements toward and from the fixed cones 31 by means of bell cranks 33 pivoted at 34 on the bar 27. The free ends of the bell cranks or those remote from the clutch or yoke ends are pivoted loosely at 35 to the front end of a manual controlling means in the form of a rod 36. When the rod 36 is forced or drawn rearward the yokes of the bell cranks are forced away from each other, causing the clutch members 32 to engage the cones 31. The direction of rotation of the cones at this time is indicated by dotted arrows, and the teeth of the members 32 meshing with the spur gears 37 on a counter shaft 38, cause the movement of the actuator forward for the application of the brakes in the same direction as above described, due to the engagement of the rack teeth with a gear 39 fixed to the shaft 38. Because of the toggle effect of the bell cranks it is possible to secure ample engagement between the clutch members 32 and the cones to cause sufficiently positive rotation of the gear members for operating the actuator, although obviously the braking effect, either forward or rearward, may be regulated at the manual means so as to produce any desired degree of friction at the clutches. It will be understood that the spring 22 will return the actuator to normal position whether the actuator has been moved by either of the manual devices, and it will be understood also that the manual devices will be actuated independently so that when one is operated the other will leave the associated clutch members disengaged and idle.

From the foregoing it will be noted that I have provided a most powerful and prompt acting brake mechanism for any type of moving vehicle or machine, and one which will be operated forcibly largely by the momentum of the vehicle or machine itself.

I claim:

1. The herein described momentum operated brake, in combination with a rotating axle and wheel connected thereto, the brake comprising a friction shoe co-operating with the wheel, a clutch cone fixed to the axle, a clutch member normally loose upon the axle adjacent to the cone, manual means to cause the loose clutch member to engage the cone, the clutch member being provided with spur teeth, an actuator rack lying transverse to and above the axle and having its teeth meshing with the teeth of the clutch member whereby when the clutch member is rotated from the axle the actuator will be moved in a predetermined direction, auxiliary means adapted to act upon the rack to cause it to move in the same predetermined direction when the wheel and axle are rotated in the opposite direction from that first indicated, and lever means between the actuator and the friction shoe to cause the latter to engage the wheel with the force proportional to the force applied to the actuator irrespective of the direction of movement of the machine.

2. The herein described momentum operated brake comprising in combination, a rotating axle and wheel connected thereto, a brake shoe co-operating with the wheel, a friction clutch member fixed to the axle, a companion clutch member, manual means to cause the clutch members to engage each other, the loose clutch member being provided with spur teeth, an actuator rack lying upon the loose clutch member and having its teeth meshing with the teeth thereof whereby when the clutch members are engaged the rotation of the axle will cause movement of the actuator in a predetermined direction, lever means between the actuator and the friction shoe to cause the latter to engage the wheel with a force proportional to the force applied to the actuator, and regulating means co-operating with said lever means for the adjustment thereof with respect to the shoe, said regulating means comprising a knuckle pivoted to the lever means, a member between the knuckle and the shoe, and an adjustable screw extending through the end of the lever means and bearing against the side of the knuckle remote from the shoe.

3. The herein described momentum operated brake, in combination with a rotating axle and wheel connected thereto, the brake comprising a friction shoe co-operating with the wheel, a clutch cone fixed to the axle, and having two conical faces, two clutch members normally loose upon the axle adjacent to the cone and co-operating respectively with the two faces of the cone, manual means for operating the clutch members including a toggle acting forcibly upon both of the loose clutch members to cause them to engage the cone simultaneously, at least one of the loose clutch members being provided with spur teeth, an actuator rack lying transverse to and upon the axle and having its teeth meshing with the spur teeth aforesaid whereby when the clutch member having the spur teeth is rotated with the axle the actuator will be moved in a predetermined direction, and lever means between the actuator and the friction shoe to cause the latter to engage the wheel with a force proportional to the force applied to the actuator.

4. A device as set forth in claim 3 including a counter shaft parallel to the axle, a gear fixed to the counter shaft and meshing with the rack teeth, and auxiliary means between the axle and the counter shaft to cause the rotation of the counter shaft in a forward direction for setting the brake when the axle is rotating in a reverse direction.

In testimony whereof I affix my signature.

JOAQUIM COUTINHO da NOBREGA.